(12) United States Patent
Yamada

(10) Patent No.: US 6,882,599 B2
(45) Date of Patent: Apr. 19, 2005

(54) OPTICAL PICKUP DEVICE, ABERRATION CORRECTING METHOD AND ABERRATION DETECTING UNIT THEREFOR

(75) Inventor: Eiji Yamada, Tenri (JP)

(73) Assignee: Sharp Kabushiki Kaisha, Osaka (JP)

(*) Notice: Subject to any disclaimer, the term of this patent is extended or adjusted under 35 U.S.C. 154(b) by 334 days.

(21) Appl. No.: 09/876,479

(22) Filed: Jun. 7, 2001

(65) Prior Publication Data

US 2002/0018406 A1 Feb. 14, 2002

(30) Foreign Application Priority Data

Jun. 8, 2000 (JP) ........................................ 2000-171597

(51) Int. Cl.⁷ .............................................. G11B 7/095
(52) U.S. Cl. ................................. 369/44.23; 369/44.41; 369/112.12; 369/44.32; 369/53.28
(58) Field of Search ...................... 369/44.23, 112.12, 369/112.15, 112.24, 44.32, 53.28

(56) References Cited

U.S. PATENT DOCUMENTS

| | | | | |
|---|---|---|---|---|
| 4,807,212 A | * | 2/1989 | Kaneda et al. ............ | 369/44.14 |
| 5,446,710 A | * | 8/1995 | Gardner et al. .......... | 369/44.14 |
| 5,623,465 A | * | 4/1997 | Sasaki et al. ............. | 369/44.32 |
| 5,677,903 A | * | 10/1997 | Holtslag et al. ......... | 369/112.28 |
| 5,708,638 A | * | 1/1998 | Braat et al. .............. | 369/44.29 |
| 5,745,265 A | * | 4/1998 | Hasegawa et al. ............. | 359/15 |
| 5,850,380 A | * | 12/1998 | Kubo ..................... | 369/112.04 |
| 6,339,562 B1 | * | 1/2002 | Sakai ....................... | 369/44.23 |
| 6,430,137 B1 | * | 8/2002 | Saimi et al. ............. | 369/112.1 |
| 6,498,330 B1 | * | 12/2002 | Yoshida .................... | 250/201.5 |

FOREIGN PATENT DOCUMENTS

JP          A-11-195229         7/1999

* cited by examiner

*Primary Examiner*—Brian E. Miller
*Assistant Examiner*—Peter Vincent Agustin
(74) *Attorney, Agent, or Firm*—David G. Conlin; David A. Tucker; Edwards & Angell, LLP

(57) ABSTRACT

An optical pickup device has a semiconductor laser for emitting a light beam, a hologram, a light-concentrating optical system, a collimation lens and a measuring unit for measuring quantity of light. The hologram generates a first light beam by splitting the light beam, which has passed through the light-concentrating optical system, along a first straight line that is perpendicular to the optical axis of the light beam and serves as a boundary, and then guides the light beam to the measuring unit. The measuring unit is provided with photosensors, which are provided linearly symmetrical each other with respect to an axis of symmetry of a straight line that extends through the optical axis of the first light beam and corresponds to the first straight line and arranged in positions located apart from the optical axis of the first light beam. An aberration signal is detected by a difference between electric signals from two of the photosensors. By measuring and correcting the spherical aberration of a light-concentrating optical system, the optical pickup device records and reproduces information on each information recording layer of a multi-layer optical disk even when a cover glass thickness error, a lens interval error and a lens thickness error exist.

6 Claims, 11 Drawing Sheets

OPTICAL PICKUP DEVICE, ABERRATION CORRECTING METHOD AND ABERRATION DETECTING UNIT THEREFOR

BACKGROUND OF THE INVENTION

The present invention relates to an optical pickup device capable of detecting an aberration occurring in a light-concentrating optical system, an aberration correcting method and an aberration detecting unit for the pickup device.

An increase in recording density has been promoted by increasing the track recording density and narrowing the track pitch of the information recording layer of an optical disk. For this purpose, it is required to reduce the diameter of a light beam concentrated on the information recording layer of the optical disk. As a method for reducing the beam diameter, it has conventionally been promoted to increase the numerical aperture (NA) of a light beam emitted from the object lens of an optical pickup device for executing recording and reproduction on the optical disk and shortening the wavelength of the light beam.

However, when NA is increased to, for example, 0.85, it is difficult to construct the object lens of a single lens. As NA is increased, the fabrication tolerance and the assembly tolerance of the lens become severe. Therefore, the object lens constructed of a single lens is hard to make the aberration fall within the tolerance, and this disables beam diameter reduction. Accordingly, it has been attempted to combine the object lens with a hemispheric lens for the construction of an object lens with two lenses (coupled lens). This arrangement allows the fabrication tolerance and the assembly tolerance of the lens to be relieved and allows high NA to be achieved.

With regard to the optical disk, the information recording layer is covered with a cover glass in order to protect the information recording layer from dust and scratches. That is, a light beam emitted from the object lens passes through the cover glass and comes into a focus by being concentrated on the information recording layer located under the cover glass. When the light beam passes through the cover glass, a spherical aberration (SA) occurs. The spherical aberration SA is proportional to a thickness d of the cover glass and the fourth power of NA.

$$SA \propto d \cdot NA^4 \quad (1)$$

The object lens is designed so as to cancel this spherical aberration, by which the spherical aberration of the light beam that has passed through the object lens and the cover glass is sufficiently reduced. However, if the thickness of the cover glass is deviated from a prescribed value, then a spherical aberration occurs in the light beam concentrated on the information recording layer, and the beam diameter is disadvantageously increased. Accordingly, there occurs the problem that the information cannot correctly be read and written. According to the expression (1), an error of the spherical aberration caused by a thickness error $\Delta d$ of the cover glass is proportional to $\Delta d$ and the fourth power of NA.

When the NA of the object lens is about 0.6 as in DVD (Digital Versatile Disc), the error of the spherical aberration caused by the thickness error of the cover glass is small, and the light beam concentrated on each information recording layer has been able to be concentrated on a sufficiently reduced spot.

Furthermore, a multi-layer optical disk formed by laminating information recording layers so that the increase in density of record information in the direction of thickness of the optical disk has already been commercialized as two-layer disk of DVD (Digital Versatile Disc). An optical pickup device for the recording and reproduction of the multi-layer optical disk as described above is required to concentrate the light beam into a sufficiently reduced spot on each information recording layer of the optical disk. However, the thickness from the surface of the optical disk to each information recording layer is varied every information recording layer. Therefore, the spherical aberration occurring when the light beam passes through the cover glass of the optical disk is varied every information recording layer. For example, a difference $\Delta SA$ between the spherical aberrations occurring in adjoining information recording layers is proportional to an interlayer distance t of the adjoining information recording layers and the fourth power of NA according to the expression (1).

In the case where the NA of the object lens is about 0.6 as in DVD, the difference $\Delta SA$ between the spherical aberrations of the information recording layers is small, and the light beam concentrated on each information recording layer has been able to be concentrated on a sufficiently reduced spot.

However, even if the thickness error $\Delta d$ of the cover glass is same, a greater spherical aberration SA occurs as NA is increased. For example, an about fourfold spherical aberration SA occurs when NA=0.85 by comparison with the case where NA=0.6. Therefore, it is required to correct the spherical aberration caused by the thickness error of the cover glass according as NA is increased as in the case where NA=0.85.

Furthermore, even if the interlayer distance t between the adjoining information recording layers is same, a greater difference $\Delta SA$ of the spherical aberration occurs according as NA is increased. For example, a fourfold difference $\Delta SA$ of the spherical aberration occurs when NA=0.85 by comparison with the case where NA=0.6. Therefore, it is required to correct the difference $\Delta SA$ between the spherical aberrations of the information recording layers according as NA is increased as in the case where NA=0.85.

For example, Japanese Patent Laid-Open Publication No. HEI 11-195229 discloses an optical pickup device that corrects the aforementioned spherical aberration. This optical pickup device has a thickness sensor for measuring the thickness of the cover glass for the optical measurement of the thickness of the cover glass, corrects the spherical aberration based on the measurement result and sufficiently reduces the diameter of the light beam concentrated on each information recording layer of the optical disk.

However, the aforementioned optical pickup device has had the problem that it is required to be separately provided with the thickness sensor and the optical pickup device has been able to be neither compacted nor reduced in cost.

The object lens, which is constructed of two lenses, is required to be assembled so that the lens interval of the two lenses comes to have a prescribed value. However, if the lens interval is deviated from the prescribed value, i.e., if a lens interval error exists, then a spherical aberration occurs in the assembled object lens. Furthermore, if the two lenses have a lens thickness error due to the fabrication tolerance of the two lenses, then a spherical aberration occurs in the assembled object lens.

As described above, a spherical aberration occurs in the object lens due to the lens interval error and the lens thickness error. In general, the lens interval error and the lens thickness error are reduced to such an extent that no problem occurs when recording and reproducing information on the information recording layers of the optical disk. However, an expensive assembling apparatus is necessary for the assembling of the object lens so that the lens interval error is reduced, and a long time is required for the assembling. Furthermore, the manufacturing of the object lens of a small lens thickness error costs much.

As described above, there has conventionally been the problem that the optical pickup device can be neither reduced in cost nor manufactured in a short time.

SUMMARY OF THE INVENTION

The present invention has been made in view of the aforementioned problems and has an object of providing an optical pickup device, which can correct the spherical aberration without separately providing a thickness sensor and sufficiently reduce the diameter of a light beam concentrated on each information recording layer of an information recording layer of a single-layer optical disk or a multi-layer optical disk even when a cover glass thickness error, a lens interval error and a lens thickness error exist, and providing an aberration correcting method and an aberration detecting unit for the device.

According to a first aspect of the present invention, there is provided an optical pickup device comprising: a light source; a light-concentrating optical system for concentrating a light beam emitted from the light source on a recording surface of an optical disk; an optical element means for splitting the light beam that has been reflected on the recording surface and has passed through the light-concentrating optical system; a light-receiving means for receiving a split light beam from the optical element means and measuring quantities of light of the split light beam; and an aberration signal generating means for generating an aberration signal that represents an aberration of the light-concentrating optical system based on a quantity of light of a portion near an optical axis and a quantity of light of a portion separated from the optical axis, the light beam of which has been formed through splitting by the optical element means and incident on the light-receiving means as a first light beam.

In the optical pickup device according to a second aspect of the invention, the optical pickup device further comprises a focal shift signal generating means for generating a focal shift signal by using the aberration signal based on the quantity of light measured by the light-receiving means.

In the optical pickup device according to a third aspect of the invention, the optical element means generates the first light beam by splitting the light beam that has passed through the light-concentrating optical system along a first straight line that is perpendicular to the optical axis of the light beam and serves as a boundary and guiding the first light beam to the light-receiving means, the light-receiving means comprises third and fourth regions, the third region and the fourth region are provided approximately linearly symmetrical with respect to an axis of symmetry of a straight line that extends through the optical axis of the first light beam and is located on the light-receiving means corresponding to a first straight line, the third region and the fourth region are arranged in positions located apart from the optical axis of the first light beam, and the aberration signal generating means generates the aberration signal by using a difference between electric signals from the third region and the fourth region.

In the optical pickup device according to a fourth aspect of the invention, the optical element means generates a second light beam by splitting the light beam that has passed through the light-concentrating optical system along a second straight line perpendicular to the optical axis of the light beam and serves as a boundary and guiding the second light beam to the light-receiving means, the light-receiving means comprises first and second regions, the first region and the second region are provided approximately linearly symmetrical with respect to an axis of symmetry of a straight line that extends through the optical axis of the second light beam and is located on the light-receiving means corresponding to the second straight line, the first region and the second region are located at a distance from the optical axis of the second light beam, the distance being shorter than a distance of the third region and the fourth region from the optical axis of the first light beam, and a focal shift signal generating means is provided for generating a focal shift signal by using a difference between electric signals from the first region and the second region.

In the optical pickup device according to a fifth aspect of the invention, the focal shift signal generating means generates the focal shift signal according to calculation expressed by $(S1-S2)+(S3-S4) \times K$, where K is a constant, and S1, S2, S3 and S4 are signals from the first, second, third and fourth regions, respectively.

In the optical pickup device according to a sixth aspect of the invention, a storage means for storing a plurality of focal shift signals in correspondence with a plurality of combinations of the difference between the electric signals from the first region and the second region and the difference between the electric signals from the third region and the fourth region, and the focal shift signal generating means reads from the storage means the focal shift signal corresponding to the difference between the electric signals from the first region and the second region and the difference between the electric signals from the third region and the fourth region based on the electric signals from the first through fourth regions from the light-receiving means, and outputs the focal shift signal.

In the optical pickup device according to a seventh aspect of the invention, the first straight line and the first light beam are identical to the second straight line and the second light beam, respectively.

In the optical pickup device according to an eighth aspect of the invention, the first region and the second region of the light-receiving means are each formed in a semicircular shape whose chord coincides with the axis of symmetry, and the third region and the fourth region of the light-receiving means are formed in semicircular annular shapes whose internal circumferences have radii greater than radii of outermost circumferences of the first region and the second region and arranged outside the outermost circumferences of the first region and the second region, respectively.

In the optical pickup device according to a ninth aspect of the invention, the third region, the first region, the second region and the fourth region of the light-receiving means are each formed in a rectangular shape and arranged parallel in this order in a direction perpendicular to the axis of symmetry.

In the optical pickup device according to a tenth aspect of the invention, the light-concentrating optical system comprises an object lens of a combination of a plurality of lenses.

In the optical pickup device according to an eleventh aspect of the invention, the optical pickup device further comprises a spherical aberration correcting means for correcting a spherical aberration of the light-concentrating optical system based on the aberration signal from the aberration signal generating means.

According to a twelfth aspect of the invention, there is provided an aberration correcting method for correcting a spherical aberration by means of the optical pickup device claimed in claim 11, comprising the steps of: correcting the focal shift of the light-concentrating optical system; and thereafter correcting the spherical aberration.

According to a thirteenth aspect of the invention, there is provided an aberration correcting method for correcting a spherical aberration by means of the optical pickup device claimed in claim 11, comprising the steps of: periodically driving the spherical aberration correcting means; and correcting the spherical aberration of the light-concentrating optical system based on the spherical aberration detected by an aberration detecting means during the driving.

According to a fourteenth aspect of the invention, there is provided an aberration detecting unit comprising: a light-concentrating optical system for concentrating a light beam on a reflecting body; an optical element means for splitting the light beam that has been reflected on the reflecting body and has passed through the light-concentrating optical system; a light-receiving means for receiving a split light beam from the optical element means and measuring a quantity of light of the split light beam; and an aberration signal generating means for generating an aberration signal that represents an aberration of the light-concentrating optical system based on a quantity of light of a portion near an optical axis and a quantity of light of a portion separated from the optical axis, the light beam of which has been formed through splitting by the optical element means and incident on the light-receiving means as a first light beam.

It is to be noted that the reflecting body of the fourteenth aspect of the invention may be any one so long as the reflecting body can reflect a light beam. Therefore, the reflecting body includes any optical disk.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention will be described below with reference to FIGS. 1 through 14. According to the present embodiment, there is provided an optical recording and reproducing device that has an optical pickup device provided with an aberration detecting unit for measuring a spherical aberration of a light-concentrating optical system.

Figure 2:
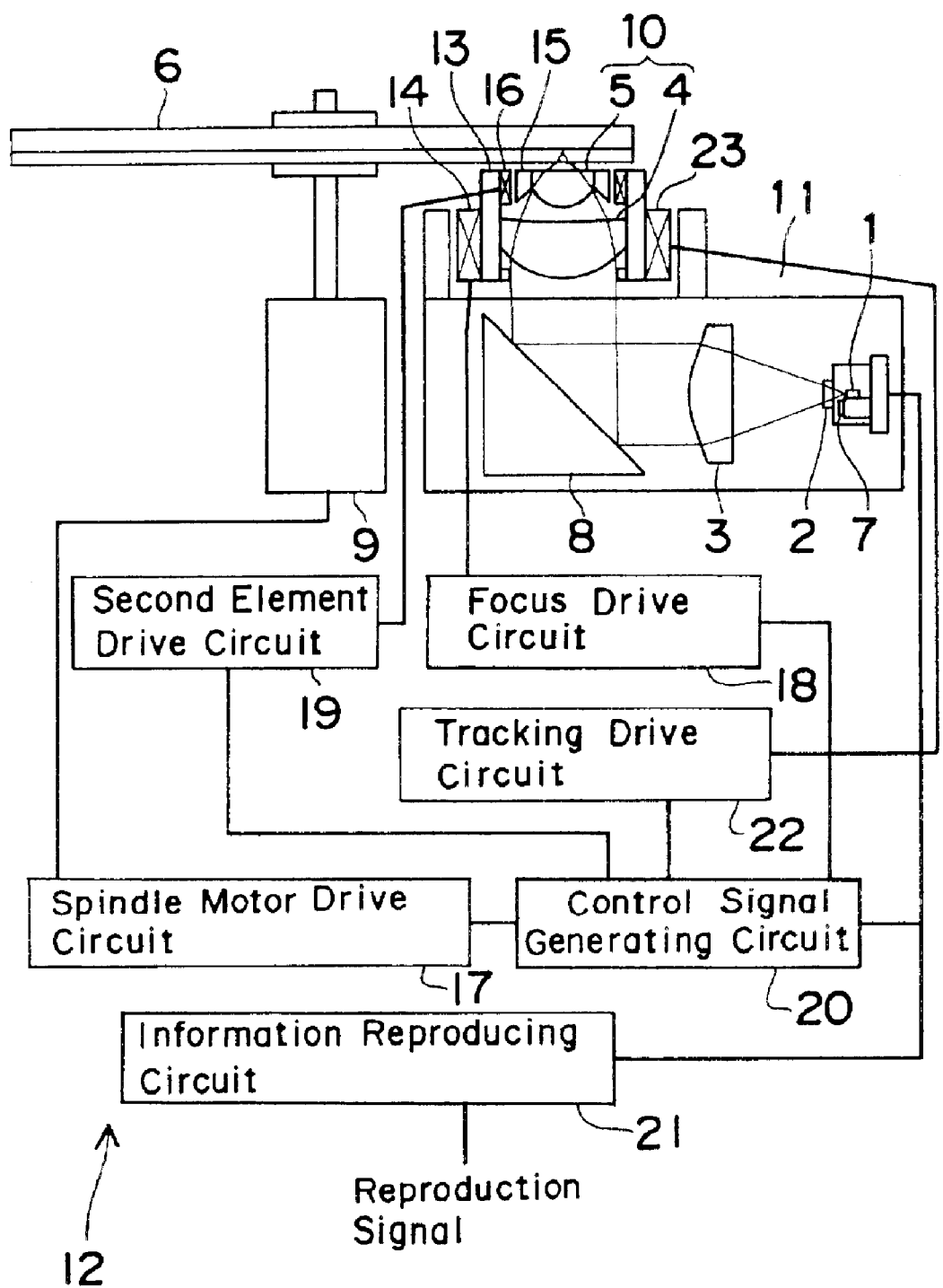
FIG. 2 is a schematic diagram showing overall structure of an optical recording and reproducing device provided with the optical pickup device shown in FIG. 1.

As shown in FIG. 2, the optical recording and reproducing device of the present embodiment includes a spindle motor 9 for rotatively driving an optical disk 6, an optical pickup device 11 for recording and reproducing information on the optical disk 6, and a drive control section 12 for controlling operations of the spindle motor 9 and the optical pickup device 11.

The optical pickup device 11 is constructed of a semiconductor laser 1 that serves as a light source, a hologram (optical element means) 2, a collimation lens 3, a light-concentrating optical system 10 composed of two lenses, and a measuring unit (light-receiving means) 7. The two lenses which are a first element 4 and a second element 5 constitutes the light-concentrating optical system 10. A mirror 8 is arranged between the light-concentrating optical system 10 and the collimation lens 3, and the mirror 8 refracts an optical path of a light beam from the light-concentrating optical system 10 or a light beam from the collimation lens 3 by an angle of about 90 degrees.

Furthermore, a periphery of the first element 4 is held by a holder 13, and a focus actuator 14 and a tracking actuator 23 are provided on a periphery of this holder 13. The focus actuator 14 moves the light-concentrating optical system 10 in the optical axis direction. With this arrangement, control for operation of the focus actuator 14 allows the light-concentrating optical system 10 to move to an appropriate position for focus control. The tracking actuator 23 makes it possible to move the light-concentrating optical system 10 in the radial direction (perpendicular to the direction of the track formed on the optical disk and the optical axis direction). With this arrangement, controlling operation of the tracking actuator 23 allows a light beam to correctly track on the information tracks of the optical disk.

A periphery of the second element 5 is held by the holder 15, and a second element actuator 16 is provided on a periphery of this holder 15. By controlling this second element actuator 16, an interval between the first element 4 and the second element 5 is adjusted to correct the spherical aberration that occurs in the light-concentrating optical system 10.

The drive control section 12 is constructed of a spindle motor drive circuit 17 for controlling the spindle motor 9; a focus control circuit 18 for controlling the focus actuator 14; a tracking drive circuit 22 for controlling the tracking actuator 23; a second element drive circuit (spherical aberration correcting means) 19 for controlling the second element actuator 16; a control signal generating circuit (including an aberration signal generating means and a focal shift signal generating means) 20 for generating control signals for the spindle motor drive circuit 17, the focus drive circuit 18, the tracking drive circuit 22 and the second element drive circuit 19; and an information reproducing circuit 21 for reproducing information from a signal obtained from the measuring unit 7 and generating a reproduction signal.

The optical pickup device 11 will be described here in detail with reference to FIG. 1. It is to be noted that the mirror 8 shown in FIG. 2 is not shown in the optical pickup device 11 of FIG. 1, for the sake of convenience of explanation.

In the optical pickup device 11, the hologram 2, the collimation lens 3, the first element 4 and the second element 5 are arranged on an optical axis OZ which is formed between the light-emitting surface of the semiconductor laser 1 and the optical disk 6. The measuring unit 7 is arranged in the vicinity of the focus position of a diffraction light of the hologram 2.

Therefore, in the optical pickup device 11, a light beam emitted from the semiconductor laser 1 passes as a zero-order diffraction light through the hologram 2, and transformed into a parallel light by the collimation lens 3. Thereafter, the light passes through the first element 4 and the second element 5 so as to be concentrated on the information recording layer on the optical disk 6. On the other hand, a light beam reflected on the information recording layer of the optical disk 6 is made to pass through the second element 5, the first element 4 and the collimation lens 3, incident on the hologram 2, diffracted by the hologram 2 and concentrated on the measuring unit 7.

The optical disk 6 is constructed of a cover glass 6a, a substrate 6b and two information recording layers 6c and 6d. The information recording layers 6c and 6d are formed between the cover glass 6a and the substrate 6b. The optical disk 6 is a two-layer disk, and the optical pickup device 11 reproduces information from the information recording layer by concentrating the light beam on the information recording layer 6c or 6d. In the following description, it is defined that the information recording layer of the optical disk 6 indicates either the information recording layer 6c or 6d and that the optical pickup device 11 can record or reproduce information on either information recording layer by concentrating the light beam on the layer.

The hologram 2 has three regions 2a, 2b and 2c. The first region 2a is a region enclosed by a first straight line CL1 perpendicular to an optical axis OZ (a diameter) and a first semicircle E1 that centers at the optical axis OZ. A second region 2b and a third region 2c are defined by quadrant regions. The quadrant regions are obtained by dividing into halves a second semicircle region located on the opposite side of the first semicircle region 2a by using a third straight line CL2 that is perpendicular to the optical axis OZ and the first straight line CL1. In this case, the third straight line CL2 perpendicularly extends in the radial direction of the optical disk 6 as described later.

The hologram 2 transmits a light emitted from the semiconductor laser 1 directly to the side of the optical disk 6 without diffraction, and diffracts the light reflected on the optical disk 6 so as to guide the light to the measuring unit 7.

The regions of the hologram 2 are formed so that each light beam passing through the regions of the hologram 2 from the optical disk side is split and separately concentrated. With this arrangement, the light beam passing through the three regions of the hologram 2 from the optical disk side comes to form three concentrated light spots. That is, with regard to the light beam reflected on the information recording layer of optical disk 6, a first beam of light (first light beam) that has passed through the first region 2a of the hologram 2 forms a concentrated light spot on a first light-receiving section, a second light beam that has passed through the second region 2b forms a concentrated light spot on a second light-receiving section, and a third light beam that has passed through the third region 2c forms a concentrated light spot on a third light-receiving section.

Figure 3:
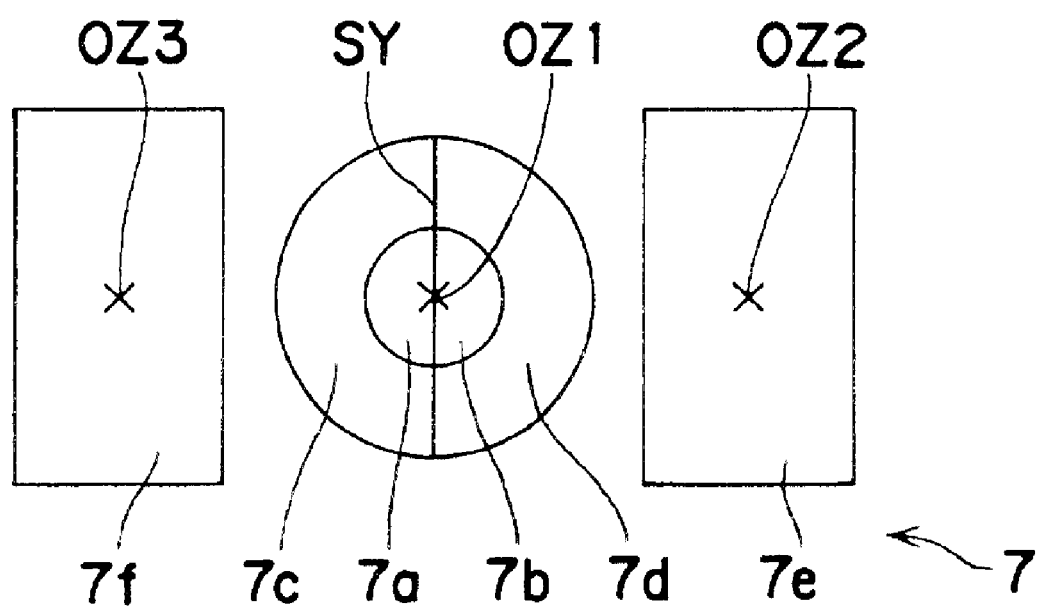
FIG. 3 is a schematic diagram of a measuring unit shown in FIG. 1.

FIG. 3 is a diagram showing the detail of the measuring unit 7. The measuring unit 7 has six photodetectors 7a through 7f. A first light-receiving section is formed by arranging parallel the photodetectors 7a, 7b, 7c and 7d. A second light-receiving section is formed singly of the photodetector 7e, while a third light-receiving section is formed singly of the photodetector 7f. The light beams diffracted by the regions of the hologram 2 are guided to the respective light-receiving sections of the measuring unit 7. In FIG. 3, the optical axes OZ1, OZ2 and OZ3 of the light beams diffracted by the first region 2a, the second region 2b and the third region 2c, respectively, of the hologram 2 pass through the marks x of the first light-receiving section, the second light-receiving section and the third light-receiving section, respectively.

The photodetectors 7a and 7b are each formed in a semicircular shape (i.e., a semicircular shape whose chord is the axis of symmetry SY) enclosed by the axis of symmetry SY that is a straight line (parallel straight line here) that extends through the optical axis OZ1 and corresponds to the first straight line CL1 and a first circle that centers at the optical axis OZ1.

The photodetectors 7c and 7d are each formed in a semicircular annular shape that centers at the optical axis OZ1. More specifically, the photodetectors are formed in a semicircular annular shape enclosed by the axis of symmetry SY, a second circle that has a radius slightly greater than that of the first circle and a third circle that has a radius greater than that of the second circle.

The photodetectors 7a and 7c are located on the same side with respect to the axis of symmetry SY, while the photodetectors 7b and 7d are located on the other side.

As described above, on the photodetectors 7a, 7b, 7c and 7d is incident light beam that has been diffracted by the first region 2a of the hologram 2 and belongs to the light beam that has been reflected on the information recording layer of the optical disk 6 and has passed through the light-concentrating optical system 10 constructed of the second element 5 and the first element 4. On the photodetector 7e is incident light beam that has been diffracted by the second region 2b of the hologram 2 and belongs to the light beam that has been reflected on the information recording layer of the optical disk 6 and has passed through the light-concentrating optical system 10 constructed of the second element 5 and the first element 4. On the photodetector 7f is incident light beam diffracted by the third region 2c of the hologram 2 and belongs to the light beam that has been reflected on the information recording layer of the optical disk 6 and has passed through the light-concentrating optical system 10 constructed of the second element 5 and the first element 4.

The light beams received by the photodetectors 7a through 7f are converted into electric signals S1 through S6, respectively. The electric signals obtained by the photodetectors 7a through 7f are outputted to the control signal generating circuit 20 shown in FIG. 2 and used for adjusting the movement of the first element 4 and the second element 5 in the light-concentrating optical system 10.

The above-mentioned electric signals are outputted to the information reproducing circuit 21 and converted into a reproduction signal RF. That is, the reproduction signal RF recorded on the optical disk 6 is given by the expression:

$$RF=S1+S2+S3+S4+S5+S6 \qquad (2)$$

In order to concentrate the light beam emitted from the light-concentrating optical system 10 on the track formed on the optical disk, tracking drive control is executed. That is, by driving the tracking actuator 23 to move the light-concentrating optical system 10 in the radial direction of the optical disk 6, the light beam is concentrated on the track. In this case, a tracking error signal TES representing the quantity of deviation of the concentrated light beam in the radial direction from the track is expressed by the expression:

$$TES=S5-S6 \qquad (3)$$

This measurement method is so called the push-pull method, which utilizes the phenomenon that an unbalanced reflection/diffraction light pattern is generated in the radial direction depending on the positional relation between the track and the concentrated light spot. Accordingly, in order to measure the quantity of this unbalance, the third straight line CL2 that divides the second region 2b and the third region 2c owned by the hologram 2 should preferably be perpendicular to the radial direction of the optical disk 6.

Therefore, when the electric signals S5 and S6 obtained by the photodetectors 7e and 7f have equal values as described above, i.e., when no tracking error is occurring, the tracking error signal TES is zero. When the concentrated light beam is deviated from the track in the radial direction, the tracking error signal TES is not zero.

Therefore, in order to make the tracking error signal TES zero, the light-concentrating optical system 10 is moved in the radial direction by the tracking actuator 23 provided in the holder 13 that retains the light-concentrating optical system 10. The quantity of movement of the tracking actuator 23 by the tracking drive circuit 22 at this time is adjusted by a control signal obtained by the control signal generating circuit 20 on the basis of the tracking error signal TES.

Figure 4A:
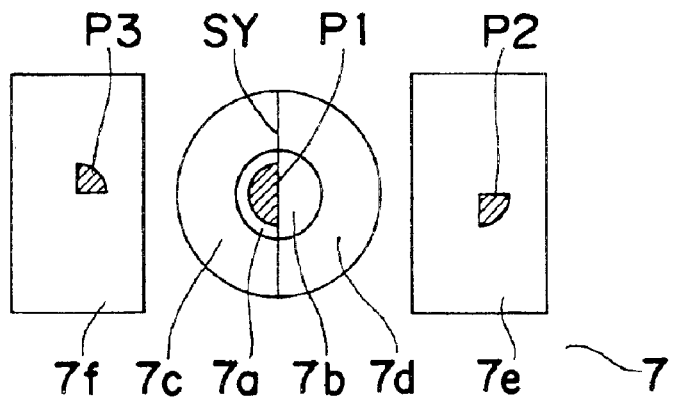
FIGS. 4A, 4B and 4C are explanatory views of concentrated light spots changing in shape on the measuring unit when a focal shift occurs.
Figure 4B:
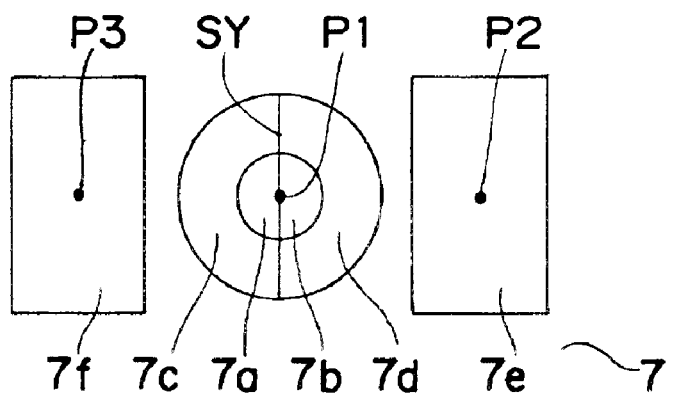

When an interval between the first element 4 and the second element 5 is adjusted by operating the second element actuator so as to cancel the spherical aberration and so on varied depending on the thickness error of the cover glass of the optical disk 6 and the information recording layers 6c and 6d and a distance (WD: Working Distance) between the light-concentrating optical system 10 and the optical disk 6 is adjusted by operating the focus actuator 14 so that a focus is obtained (without focal shift) on the information recording layer 6c or 6d of the optical disk 6, the concentrated light spots PI through P3 formed in the first through third light-receiving sections come to have almost same size as shown in FIG. 4B. That is, the concentrated light spot on the information recording layer and the concentrated light spot on the measuring unit 7 have a conjugate relation. At this time, the first light beam of the light beam diffracted by the hologram 2 is formed so that the light-receiving areas of the photodetectors 7a and 7b become equal to each other. That is, the value of the electric signal S1 obtained from the photodetector 7a and the value of the electric signal S2 obtained from the photodetector 7b become equal to each other.

In this case, a focal shift signal FES representing the focal shift of the light beam concentrated on the information recording layer of the optical disk 6 is expressed by the expression:

$$FES=S1-S2 \qquad (4)$$

The focal shift represents the quantity of departure of the focal point on which the light beam passing through the light-concentrating optical system 10 from the semiconductor laser 1 side is concentrated from the position of the information recording layer of the optical disk 6. In the presence of a focal shift, the light beam incident on the information recording layer of the optical disk 6 has a beam diameter greater than in the absence of the focal shift. When the values of the electric signals S1 and S2 obtained by the photodetectors 7a and 7b are equal to each other as described above, i.e., when no focal shift occurs, the focal shift signals FES is zero. The focal shift measurement expressed by the expression (4) is generally called the knife edge method.

Figure 4C:
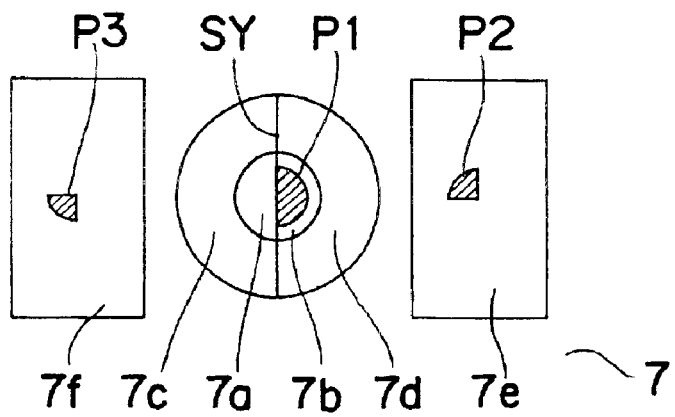

When the focal point of the light beam concentrated on the information recording layer of the optical disk 6 is shifted, the concentrated light spot P1 formed in the first light-receiving section expands in a semicircle shape. The concentrated light spot P2 formed in the second light-receiving section expands in a quadrant shape, while the concentrated light spot P3 formed in the third light-receiving section expands in a quadrant shape. For example, if the optical disk 6 moves away from the light-concentrating optical system 10, then the concentrated light spots expand on the measuring unit 7 as shown in FIG. 4A. In contrast to this, if the optical disk 6 moves closer to the light-concentrating optical system 10, then the concentrated light spots P1 through P3 expand on the measuring unit 7 as shown in FIG. 4C.

That is, when the optical disk 6 moves away from the light-concentrating optical system 10, the value of the converted electric signal S1 from the photodetector 7a becomes greater than the value of the converted electric signal S2 from the photodetector 7b, and the focal shift signal FES indicates a positive value.

When the optical disk 6 moves closer to the light-concentrating optical system 10, the value of the converted electric signal S1 from the photodetector 7a becomes smaller than the value of the converted electric signal S2 from the photodetector 7b, and the focal shift signal FES indicates a negative value.

In order to make the focal shift signal FES zero, it is proper to move the light-concentrating optical system 10 in the optical axis direction OZ by means of the focus actuator 14 provided in the holder 13 that holds the light-concentrating optical system 10. At this time, the quantity of movement of the focus actuator 14 performed by the focus drive circuit 18 is adjusted by the control signal obtained by the control signal generating circuit 20 on the basis of the focal shift signal FES.

If the focal shift is increased from the state shown in FIG. 4A or 4C, then the concentrated light spot P1 formed in the first light-receiving section expands into a larger semicircular shape and comes to be received by the photodetector 7c or 7d. Therefore, the quantity of light received by the photodetector 7a or 7b is reduced according to the above-mentioned phenomenon. Therefore, the dynamic range of the focal shift signal FES is determined by the size of the photodetector 7a and 7b, i.e., the radius of the first circle. In general, for the stabilization of the focus drive control of the optical pickup device 11, the range in which the focal shift can be measured should preferably be increased. Accordingly, the formula of generation of the focal shift signal FES should properly be expressed by the expression:

$$FES=(S1-S2)+(S3-S4) \qquad (5)$$

According to this expression (5), the focal shift can be measured even if the concentrated light spot expands to a size greater than the size of the first circle. That is, the range in which the focal shift can be measured extends to such an extent that the concentrated light spot expands to the third circle, when the spot becomes larger than in the case of the expression (4).

When a thickness error of the cover glass 6a of the optical disk 6 occurs or when the light beam is concentrated on the information recording layer other than the specified information recording layer, a spherical aberration occurs in this light beam. Therefore, in order to concentrate the light beam on the information recording layer of this optical disk 6, the spherical aberration of the light-concentrating optical system 10 is required to be corrected.

This spherical aberration is defined as a deviation of the focus position of the light beam that passes through the vicinity of the optical axis of the light-concentrating optical system 10 with respect to the focus position of the light beam that passes through the peripheral portion. In the present specification, a negative spherical aberration is defined as the aberration occurring in the case where the focus position of the light beam that passes through the peripheral portion is located far from the light-concentrating optical system 10 by comparison with the focus position of the light beam that passes through the vicinity of the optical axis of the light-concentrating optical system 10. The positive spherical aberration is defined as the aberration occurring in the case where the focus position of the light beam that passes through the peripheral portion is located close to the light-concentrating optical system 10 by comparison with the focus position of the light beam that passes through the vicinity of the optical axis of the light-concentrating optical system 10.

Figure 5B:
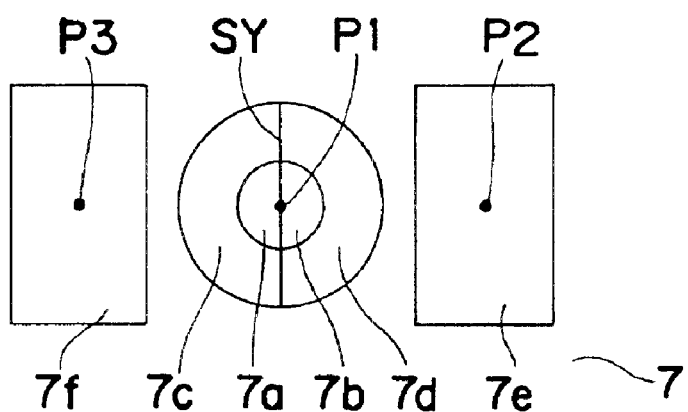
Figure 6A:
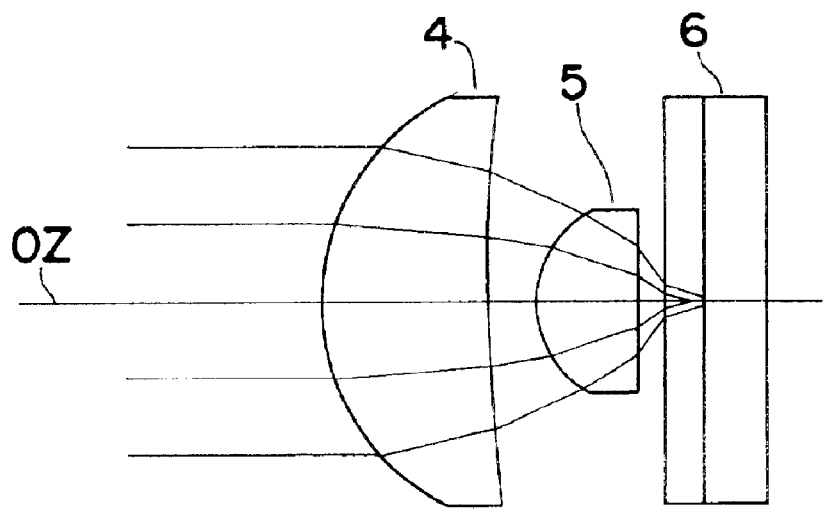
FIGS. 6A, 6B and 6C are explanatory views of changes in focus position of a light beam concentrated on an information recording layer when a spherical aberration occurs.
Figure 6B:
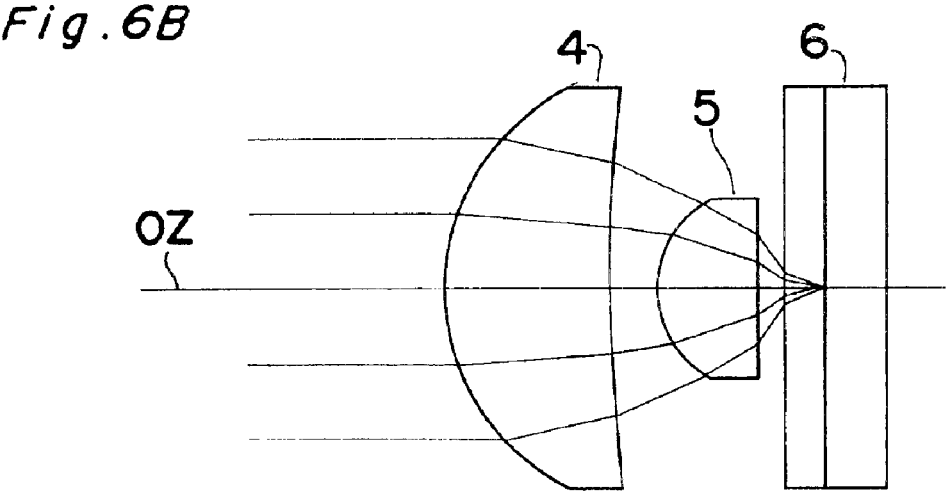
Figure 7A:
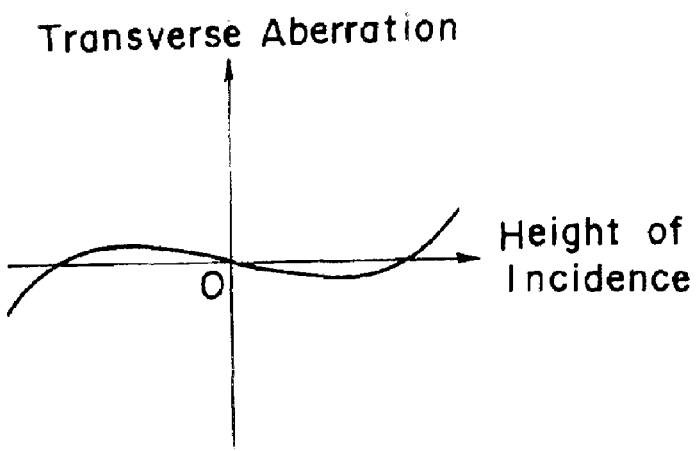
FIGS. 7A, 7B and 7C are graphs for explaining changes in transverse aberration on the information recording layer at a best image point when a spherical aberration occurs.
Figure 7B:
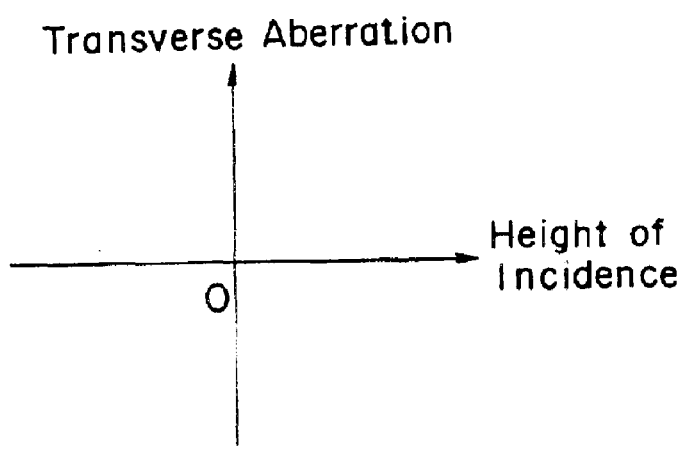

In a state in which neither spherical aberration nor focal shift occurs, the light beam that passes through the focal optic system 10 from the semiconductor laser 1 side is concentrated on one point on the information recording layer of the optical disk 6 as shown in FIG. 6B and comes to have a transverse aberration as shown in the graph of FIG. 7B. The horizontal axis of the graph of the transverse aberration represents the height of the ray of light incident on the light-concentrating optical system 10 from the optical axis OZ, while the vertical axis represents the height of a point at which the ray of light emitted from the light-concentrating optical system 10 has reached the information recording layer of the optical disk 6 from the optical axis OZ, i.e., the transverse aberration. The ray of light is entirely concentrated on one point, and therefore, the transverse aberration shown in FIG. 7B is 0 with respect to every height of incidence. At this time, the concentrated light spots P1 through P3 of the light beams in the measuring unit 7 come to have spots of almost same size, as shown in FIG. 5B.

Figure 6C:
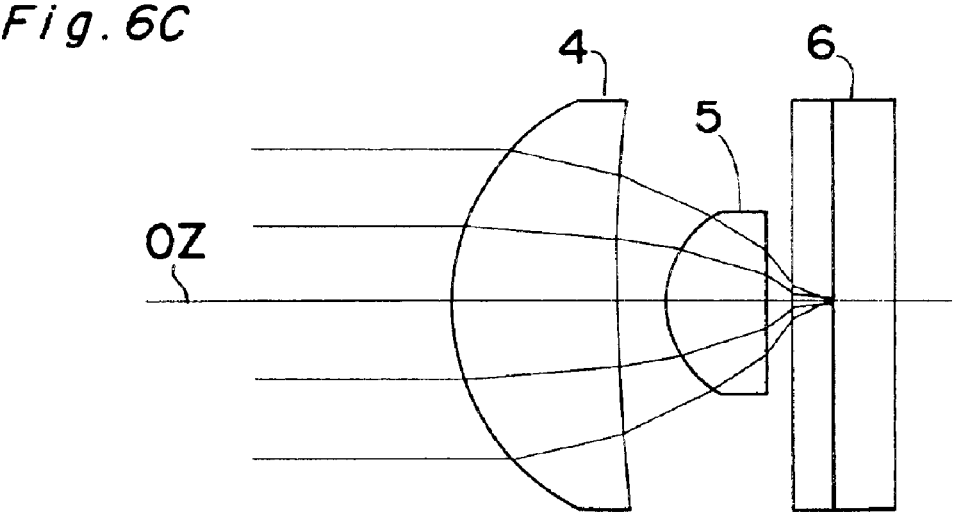

In contrast to the above, when a negative or positive spherical aberration occurs in the light-concentrating optical system 10, the light beam that passes through the light-concentrating optical system 10 is not concentrated on one point on the information recording layer of the optical disk 6, as shown in FIG. 6A or 6C.

When the negative spherical aberration occurs in the light-concentrating optical system 10, as shown in FIG. 6A, the focus position of the light beam in the peripheral portion of the light-concentrating optical system 10 is located farther from the second element 5 than the focus position of the light beam in the vicinity of the optical axis OZ. A best image point in the presence of this spherical aberration is located in the vicinity of the midpoint between the above-mentioned two focus positions. Therefore, the light beam in the vicinity of the optical axis OZ of the light-concentrating optical system 10 comes into a focus between the light-concentrating optical system 10 and the information recording layer. However, the light beam located in the peripheral portion of the light-concentrating optical system 10 will come into a focus after being reflected on the information recording layer.

In this case, the best image point is defined as the image point position where the beam diameter of the light beam is minimized. That is, in the presence of the spherical aberration, no focal shift occurs when the position of the information recording layer is located in the best image point, and the quantity of focal shift can be defined as the quantity of deviation of the position of the information recording layer from the best image point.

For the above reasons, in the case where no focal shift occurs and the negative spherical aberration occurs, the transverse aberration on the information recording layer of the optical disk 6 becomes as shown in the graph of FIG. 7A. That is, the light beam in the vicinity of the optical axis, i.e., the ray of light of a low height of incidence will reach the information recording layer after coming into a focus between the light-concentrating optical system 10 and the information recording layer. Therefore, a transverse aberration of the sign inverse to that of the height of incidence results. On the other hand, the light beam in the peripheral portion of the light-concentrating optical system 10 reaches the information recording layer before coming into a focus. Therefore, a transverse aberration of the sign identical to that of the height of incidence results.

Figure 5A:
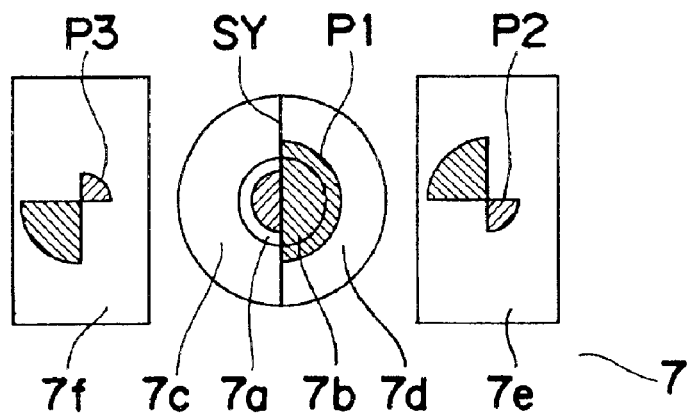
FIGS. 5A, 5B and 5C are explanatory views of concentrated light spots changing in shape on the measuring unit when a spherical aberration occurs.

In the case where no focal shift occurs and the negative spherical aberration occurs, the concentrated light spots P1 through P3 of the light beams in the measuring unit 7 come to have shapes as shown in FIG. 5A. In FIG. 5A, the region which belongs to the light-receiving section and to which the light beam in the vicinity of the optical axis is applied is indicated by the right-hand-side-up hatching, while the region which belongs to the light-receiving section and to which the light beam in the peripheral portion is applied is indicated by the right-hand-side-down hatching. That is, the region which belongs to the light-receiving section and to which the light beam in the vicinity of the optical axis is applied and the region which belongs to the light-receiving section and to which the light beam in the peripheral portion is applied are located on the mutually opposite sides with respect to the optical axis. For example, at the concentrated light spot P1 where the first light beam is concentrated on the first light-receiving section, the light beam in the vicinity of the optical axis is applied onto the photodetector 7a, while the light beam in the peripheral portion is applied onto the photodetectors 7b and 7d.

In the case where no focal shift occurs and the positive spherical aberration occurs, as shown in FIG. 6C, the focus position of the light beam in the peripheral portion of the light-concentrating optical system 10 becomes located closer to the light-concentrating optical system 10 than the focus position of the light beam located in the vicinity of the optical axis OZ. The best image point in the presence of this spherical aberration is located in the vicinity of the midpoint between the above-mentioned two focus positions. Therefore, the light beam in the vicinity of the optical axis OZ of the light-concentrating optical system 10 will come into a focus after being reflected on the information recording layer. However, the light beam in the peripheral portion of the light-concentrating optical system 10 comes into a focus between the light-concentrating optical system 10 and the information recording layer.

Figure 7C:
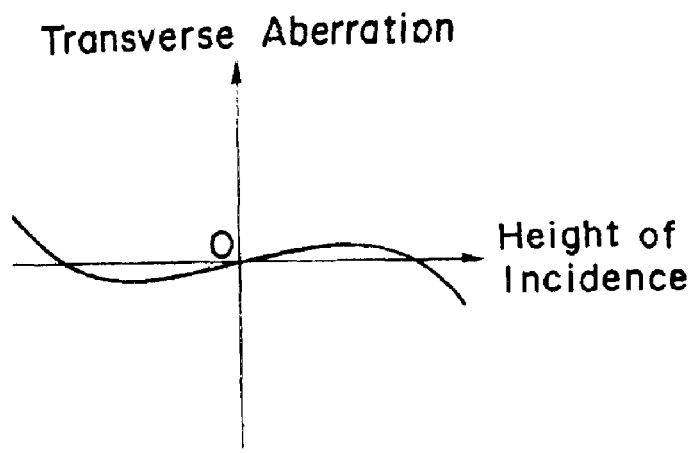

For the above reasons, in the case where no focal shift occurs and the positive spherical aberration occurs, the transverse aberration on the information recording layer of the optical disk 6 becomes as shown in the graph of FIG. 7C. That is, the light beam in the vicinity of the optical axis, i.e., the ray of light of a low height of incidence reaches the information recording layer before coming into a focus, and therefore, a transverse aberration of the sign identical to that of the height of incidence results. On the other hand, the light beam in the peripheral portion of the light-concentrating optical system 10 will reach the information recording layer after coming into a focus between the light-concentrating optical system 10 and the information recording layer. Therefore, a transverse aberration of the sign inverse to that of the height of incidence results.

Figure 5C:
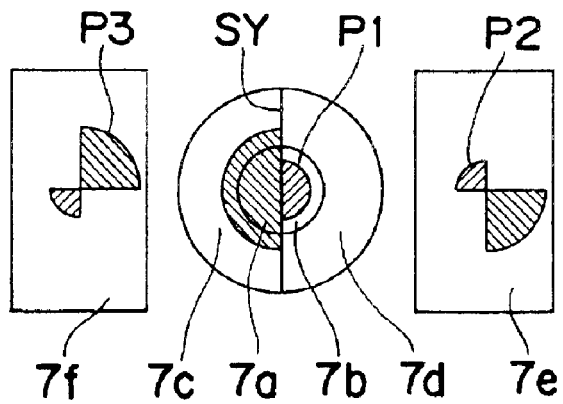

In the case where no focal shift occurs and the positive spherical aberration occurs, the concentrated light spots P1 through P3 of the light beams in the measuring unit 7 come to have shapes as shown in FIG. 5C. In FIG. 5C, the region which belongs to the light-receiving section and to which the light beam in the vicinity of the optical axis is applied is indicated by the right-hand-side-up hatching, while the region which belongs to the light-receiving section and to which the light beam in the peripheral portion is applied is indicated by the righthand-side-down hatching. That is, the region which belongs to the light-receiving section and to which the light beam in the vicinity of the optical axis is applied and the region which belongs to the light-receiving section and to which the light beam in the peripheral portion is applied are located on the mutually opposite sides with respect to the optical axis. For example, at the concentrated light spot P1 where the first light beam is concentrated on the first light-receiving section, the light beam in the vicinity of the optical axis is applied onto the photodetector 7b, while the light beam in the peripheral portion is applied onto the photodetectors 7a and 7c.

In the case where the spherical aberration occurs in the light-concentrating optical system 10, even in the absence of the focal shift, i.e., even when the focal shift signal FES is zero, the difference between the electric signals of the photodetectors 7c and 7d is not zero but comes to have a negative or positive value, as shown in, for example, FIG. 5A and 5C. This indicates that the negative or positive spherical aberration has occurred. Therefore, when the state in which no focal shift exists is maintained, a spherical aberration signal SAS that represents the spherical aberration occurring in the light-concentrating optical system 10 is expressed, by using the electric signal S3 obtained from the photodetector 7c and the electric signal S4 obtained from the photodetector 7d, as follows:

$$SAS = S3 - S4 \quad (6)$$

The spherical aberration signal SAS is generated by the control signal generating circuit 20 and outputted to the second element drive circuit 19. The second element drive circuit 19 executes driving control of the second element actuator 16 provided in the outer peripheral portion of the holder 15 that holds the second element 5 on the basis of the spherical aberration signal SAS, for the correction of the spherical aberration.

That is, the second element drive circuit executes the driving control of the second element actuator 16 in a direction in which an interval between the first element 4 and the second element 5 is lengthened when the spherical aberration signal SAS represents the negative spherical aberration and executes the driving control of the second element actuator 16 in a direction in which the interval between the first element 4 and the second element 5 is shortened when the spherical aberration signal SAS conversely represents the positive spherical aberration.

As described above, if the spherical aberration occurring in the light-concentrating optical system 10 is corrected on the basis of the spherical aberration signal SAS, then the beam diameter of the light beam concentrated on the information recording layer of the optical disk 6 can be reduced, and this allows the recording of information on the optical disk 6 and the reproduction of the information from the optical disk 6 to be satisfactorily performed.

The correction of the spherical aberration may be performed when the optical disk 6 is loaded in the optical pickup device or appropriately performed during the recording or reproduction of information after the loading of the optical disk 6 in the optical pickup device.

A method for executing the focus drive control so that the beam diameter of the light beam concentrated on the information recording layer of the optical disk 6 is minimized will be described next. In this case, it is proper to locate the position of the information recording layer at the best image point as described hereinabove.

Figure 8A:
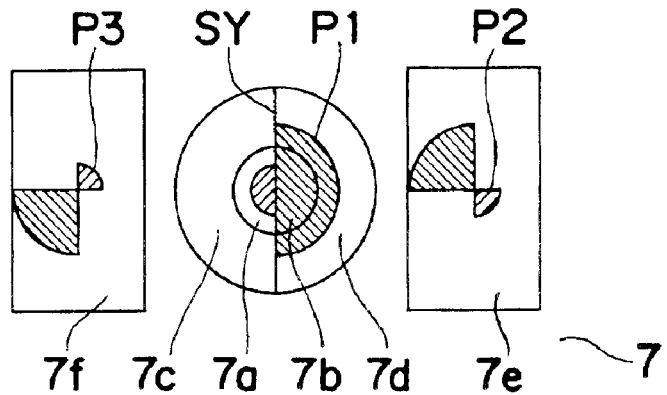
FIGS. 8A, 8B and 8C are explanatory views of concentrated light spots changing in shape on the measuring unit when a focal shift occurs in presence of a negative spherical aberration.
Figure 8B:
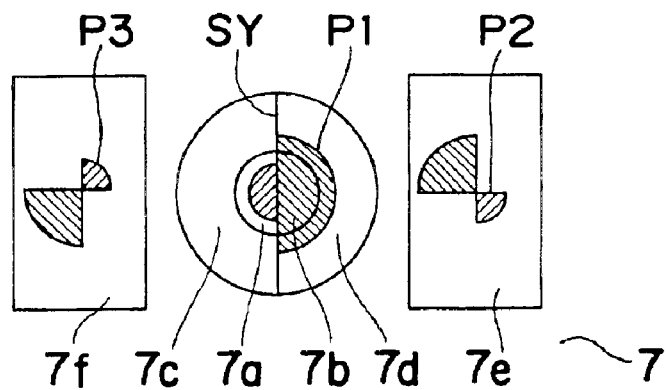
Figure 8C:
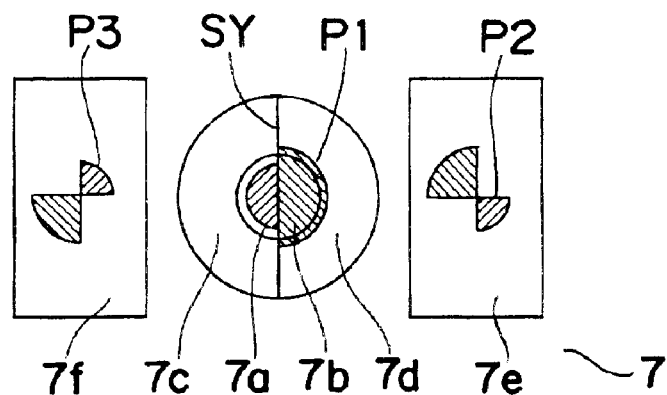

When the negative spherical aberration occurs, the shapes of the concentrated light spots P1 through P3 of the light beams in the measuring unit 7 change according to the focal shift as shown in FIGS. 8A through 8C. That is, FIG. 8A shows the case where the negative focal shift occurs, FIG. 8B shows the case where no focal shift occurs, and FIG. 8C shows the case where the positive focal shift occurs. In this case, the focal shift is defined as the deviation of the position of the information recording layer from the best image point. For example, the positive focal shift indicates the state in which the optical disk 6 is moving away from the light-concentrating optical system 10. That is, the best image point is located on the light-concentrating optical system 10 side with respect to the information recording layer.

In the case where the negative spherical aberration occurs, the signal S4 obtained from the photodetector 7d is increased in the presence of the negative focal shift as shown in FIG. 8A, and the signal S4 is reduced in the presence of the positive focal shift as shown in FIG. 8C.

Likewise, in the case where the positive spherical aberration occurs, the signal S3 obtained from the photodetector 7c is reduced in the presence of the negative focal shift, and the signal S3 is increased in the presence of the positive focal shift.

That is, the influence of the focal shift is mixed in the spherical aberration signal SAS expressed by the expression (6).

Therefore, in order to locate the position of the information recording layer at the best image point, the focal shift signal FES expressed by the expression (5) is corrected according to the expression:

$$FES = (S1 - S2) + (S3 - S4) \times K \quad (7)$$

where K is a constant. Even when the spherical aberration occurs, it is proper to determine the value of K so that the focal shift signal FES expressed by the expression (7) becomes zero when the position of the information recording layer is located at the best image point.

Therefore, by executing the focus control so that the focal shift signal FES expressed by the expression (7) becomes zero, the position of the information recording layer can be located at the best image point even when the spherical aberration occurs. Consequently, the influence of the focal shift is not mixed in the spherical aberration signal SAS, and the diameter of the light beam concentrated on the information recording layer of the optical disk 6 can be minimized.

Otherwise, it is acceptable to provide the control signal generating circuit 20 with a ROM (Read Only Memory) device (storage means) which stores the values of the focal shift signal FES obtained by preparatorily calculating or measuring the values of the focal shift signal FES according to the combinations of the values of (S1–S2) and (S3–S4) so that the focal shift signal FES becomes zero when the position of the information recording layer is located at the best image point. That is, the ROM device receives the values of (S1–S2) and (S3–S4) as inputs thereto and outputs the focal shift signal FES preparatorily stored according to the combination of the input values.

The focal shift signal FES provided by this ROM device has the advantage that a higher accuracy than in the case of the expression (7) can be achieved. Therefore, if the focus control is executed so that the focal shift signal FES provided by the ROM device becomes zero, then the position of the information recording layer is located at the best image point even when the spherical aberration occurs. Consequently, the influence of the focal shift is not mixed in the spherical aberration signal SAS, and the diameter of the light beam concentrated on the information recording layer of the optical disk 6 can be minimized.

Figure 9:
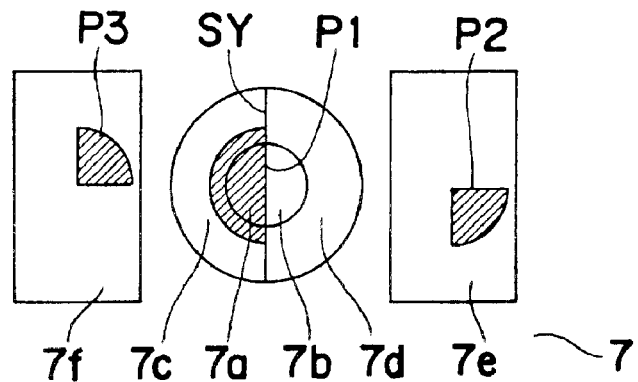
FIG. 9 is an explanatory view of concentrated light spots on the measuring unit when the focal shift is greater than that of FIG. 4A.

The measurement of the spherical aberration signal SAS should preferably be performed in the absence of the focal shift. For example, if the optical disk 6 moves away from the light-concentrating optical system 10 in the absence of the spherical aberration, then the concentrated light spots P1 through P3 of the light beams in the measuring unit 7 come to have shapes as shown in FIG. 9. In FIG. 9, the shape of the concentrated light spot P1 expands in a semicircular shape on the measuring unit 7. In this case, the quantity of focal shift shown in FIG. 9 is greater than the focal shift shown in FIG. 4A. That is, the concentrated light spot P1 expanding in the semicircular shape is received by the photodetectors 7a and 7c. The electric signal S3 obtained from the photodetector 7c is not zero, and therefore, the spherical aberration signal SAS comes to have a negative value in spite of the state in which no spherical aberration occurs. Therefore, the positive focal shift is disadvantageously measured as a negative spherical aberration by mistake. The same phenomenon occurs even when the optical disk 6 moves closer to the light-concentrating optical system 10 in the absence of the spherical aberration, and the negative focal shift is disadvantageously measured as a positive spherical aberration by mistake.

Accordingly, it is preferable to execute the focus control based on the focal shift signal FES and thereafter execute the driving control of the second element actuator based on the spherical aberration signal SAS, for the correction of the spherical aberration.

Figure 10:
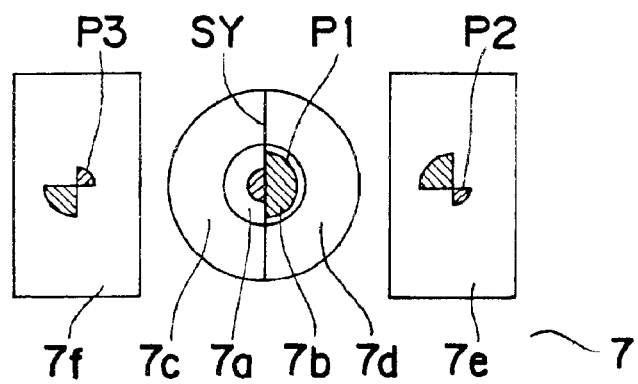
FIG. 10 is an explanatory view of concentrated light spots on the measuring unit when a minute negative spherical aberration occurs.

Furthermore, the spherical aberration cannot be sensed in a state in which a minute quantity of spherical aberration occurs. For example, FIG. 10 shows the shapes of the concentrated light spots P1 through P3 of the light beams in the measuring unit 7 in the state in which a minute negative spherical aberration occurs in the absence of the focal shift. In this case, the quantity of spherical aberration shown in FIG. 10 is smaller than the quantity of spherical aberration shown in FIG. 5A. In FIG. 10, the region which belongs to the light-receiving section and to which the light beam in the vicinity of the optical axis is applied is indicated by the right-hand-side-up hatching, while the region which belongs to the light-receiving section and to which the light beam in the peripheral portion is applied is indicated by the right-hand-side-down hatching. In the case of FIG. 10, at the concentrated light spot P1, the region which belongs to the light-receiving section and to which the light beam in the peripheral portion is applied is located inside the photodetector 7b and does not expand to the photodetector 7d. By contrast, in the case of FIG. 5A, the region which belongs to the light-receiving section and to which the light beam in the peripheral portion is applied expands to the photodetector 7b and the photodetector 7d. In the case of FIG. 10, the spherical aberration signal SAS becomes zero in spite of the state in which the spherical aberration occurs. Therefore, this minute negative spherical aberration cannot be sensed.

The same phenomenon occurs even when a minute positive spherical aberration occurs in the absence of the focal shift, and the minute positive spherical aberration cannot be sensed.

Accordingly, the minimum boundary value at which the spherical aberration can be sensed resides in the spherical aberration when the light beam in the peripheral portion expands to the photodetector 7c or 7d at the concentrated light spot P1 of the first light beam in the measuring unit 7. That is, by reducing the size of the first circle for determining the shapes of the photodetectors 7a and 7b, the minimum boundary value of the spherical aberration can be lowered.

Figure 11:
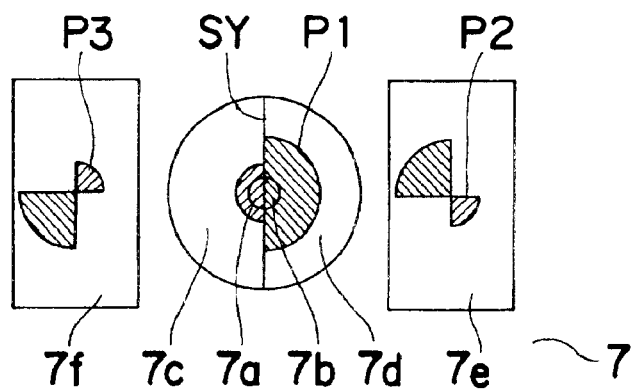
FIG. 11 is an explanatory view of concentrated light spots on the measuring unit when a first circle is small and a minute negative spherical aberration occurs.

However, if the size of the first circle is reduced, then a large spherical aberration cannot correctly be measured. FIG. 11 shows the shapes of the concentrated light spots P1 through P3 of the light beams in the measuring unit 7 in a state in which the size of the first circle of the measuring unit 7 is small and a negative spherical aberration occurs in the absence of the focal shift. In FIG. 11, the region which belongs to the light-receiving section and to which the light beam in the vicinity of the optical axis is applied is indicated by the right-hand-side-up hatching, while the region which belongs to the light-receiving section and to which the light beam in the peripheral portion is applied is indicated by the right-hand-side-down hatching. FIG. 11 differs from FIG. 5A only in the point that the size of the first circle is small, and there is coincided quantity of spherical aberration. In the case of FIG. 11, the light beam in the vicinity of the optical axis expands to the photodetectors 7a and 7c at the concentrated light spot P1 of the first light beam in the measuring unit 7. On the other hand, the light beam in the peripheral portion expands to the photodetectors 7b and 7d. Eventually, the light beam in the vicinity of the optical axis is received by the photodetector 7c, and therefore, the spherical aberration signal SAS disadvantageously falls below the proper value. That is, if the size of the first circle is reduced, then the measurable maximum boundary value of the spherical aberration is disadvantageously lowered.

According to the aforementioned facts, it is proper to determine the size of the first circle for specifying the shapes of the photodetectors 7a and 7b by a trade-off between the minimum measurement boundary value and the maximum measurement boundary value of spherical aberration.

In general, if the spherical aberration occurs, the quality of a reproduction signal RF reproduced from the optical disk is deteriorated, and an error occurs. However, the reproduction signal RF is to undergo error correction. Therefore, if the reproduction signal RF has a certain measure of quality, then the reproduction signal having no error can be restored.

For the above reasons, it is proper to set the minimum measurement boundary value of the spherical aberration to a quantity of spherical aberration such that the reproduction signal RF can sufficiently be corrected by the error correction.

Moreover, in consideration of a cover glass thickness error Δd of the optical disk, lens thickness errors of the lenses that constitute the light-concentrating optical system, lens interval errors of the lenses that constitute the light-concentrating optical system and a spherical aberration difference ΔSA generated in each information recording layer of the optical disk recorded in a multiplicity of layers, the maximum value of the spherical aberration occurring in the light beam concentrated on each information recording layer can be estimated.

Figure 12:
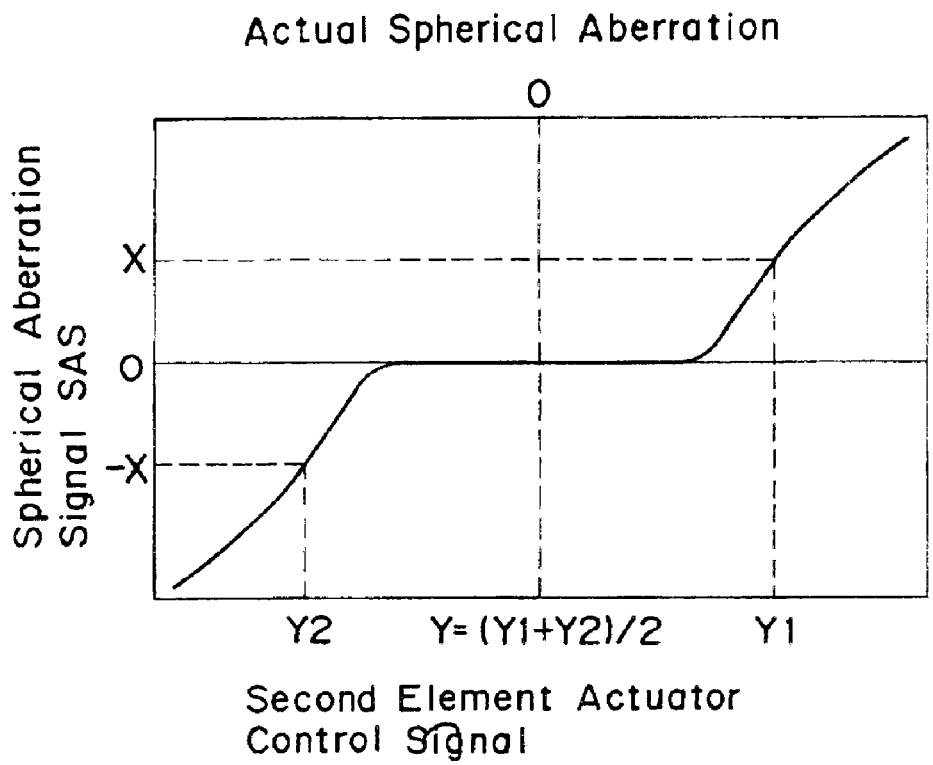
FIG. 12 is a graph showing an actual spherical aberration and a relation between a second element actuator control signal and a spherical aberration signal SAS.

It is also possible to correct the spherical aberration with accuracy below the minimum measurement boundary value of the spherical aberration. FIG. 12 is a graph showing the actual spherical aberration and a relation between the control signal of the second element actuator and the spherical aberration signal SAS. In FIG. 12, the horizontal axis represents the control signal of the spherical aberration that occurs in the light-concentrating optical system 11 or the second element actuator, while the vertical axis represents the spherical aberration signal SAS obtained by the measuring unit 7. When the spherical aberration is below the minimum measurement boundary value, the spherical aberration signal SAS is zero.

First of all, focus control is executed on the basis of the focal shift signal FES, and after establishing a state in which no focal shift exists, the second element actuator is periodically driven in, for example, a sine wave form. At this time, when the spherical aberration is greater than the minimum measurement boundary value, the spherical aberration signal SAS is obtained. Assuming that the quantity of the control signal of the second element actuator that serves as a reference value X (>0) prescribed by this spherical aberration signal SAS is Y1 and that the quantity of the control signal of the second element actuator when the spherical aberration signal SAS becomes −X is Y2, then the quantity of the control signal of the second element actuator in the state in which no spherical aberration exists can be predicted as:

$$Y=(Y1+Y2)/2 \qquad (8)$$

Then, it is proper to set the quantity of the control signal of the second element actuator to this predicted value Y from the state in which the second element actuator is driven in the sine wave form.

Figure 13:
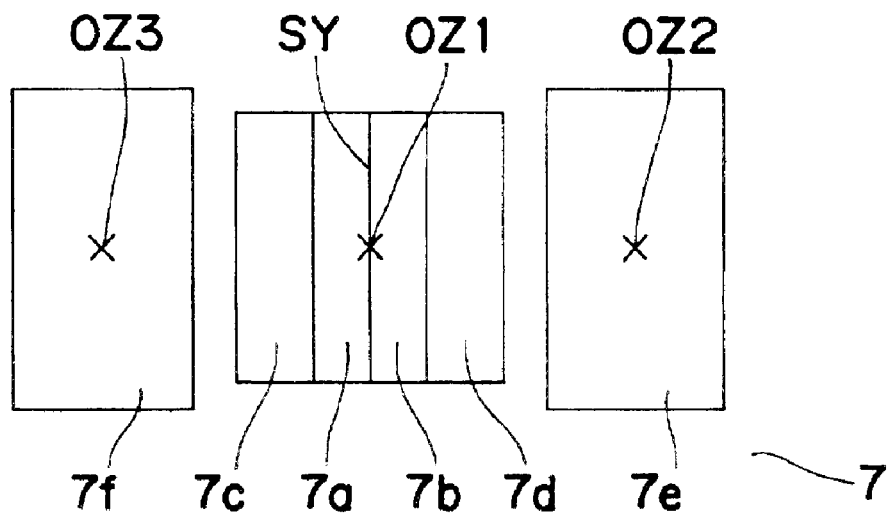
FIG. 13 is a schematic diagram showing another embodiment of the measuring unit.

According to the present embodiment, as shown in FIG. 3, the photodetectors 7a through 7d of the measuring unit 7 that measures the focal shift signal FES and the spherical aberration signal SAS have had a semicircular shape or a semicircular annular shape. In place of this shape, the photodetectors 7c, 7a, 7b and 7d may have a rectangular shape arranged in this order as shown in FIG. 13. That is, the photodetectors 7a and 7b have an identical rectangular shape and are arranged in positions linearly symmetrical with respect to the axis of symmetry SY. The photodetectors 7c and 7d have an identical rectangular shape and are arranged in positions linearly symmetrical with respect to the axis of symmetry SY. The detectors 7c, 7a, 7b and 7d are arranged in this order in a direction perpendicular to the axis of symmetry SY.

The measuring unit 7 constructed of the rectangular photodetectors 7a through 7d has the merit that no influence is exerted on the focal shift signal FES and the spherical aberration signal SAS even if the concentrated light spot P1 moves in a direction parallel to the axis of symmetry SY.

The phenomenon that the concentrated light spot P1 moves in the direction parallel to the axis of symmetry SY occurs when the light-concentrating optical system 10 moves in the radial direction by the tracking drive control. This phenomenon also occurs when the diffraction angle at which the hologram 2 diffracts the light beam changes as a consequence of the change in wavelength of the light beam emitted from the semiconductor laser.

Therefore, if the photodetectors 7c, 7a, 7b and 7d have a rectangular shape such that the photodetectors 7c, 7a, 7b and 7d are arranged in this order, as shown in FIG. 13, then the photodetectors have the merit that no influence is mixed in the focal shift signal FES and the spherical aberration signal SAS even when this tracking drive is being executed or when the wavelength changes.

Figure 14A:
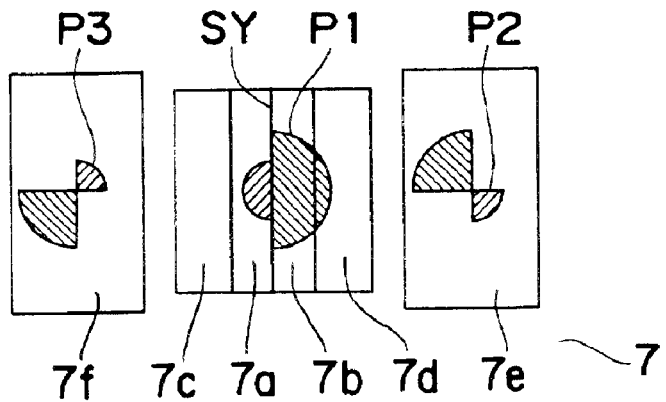
FIGS. 14A, 14B and 14C are explanatory views of concentrated light spots changing in shape on the measuring unit shown in FIG. 13 when a spherical aberration occurs.
Figure 14B:
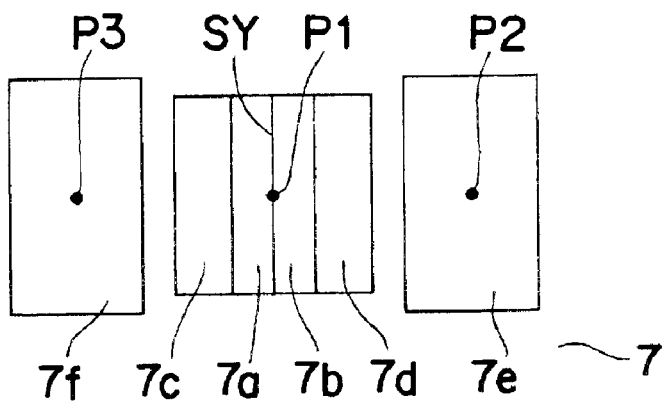
Figure 14C:
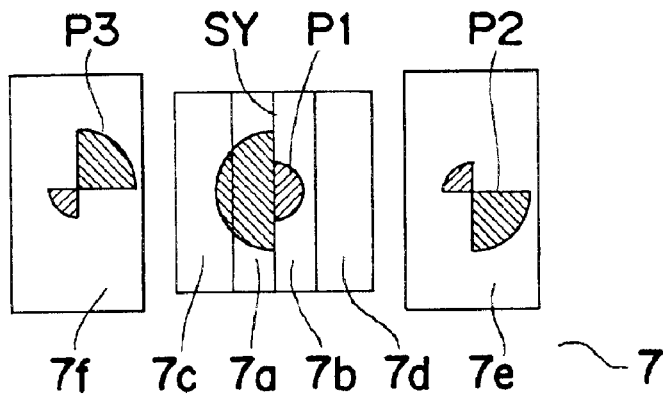

In the case of the measuring unit 7 shown in FIG. 13, the shapes of the concentrated light spots P1 through P3 of the light beams in the measuring unit 7 are shown in FIGS. 14A through 14C. FIG. 14A shows the case where the negative spherical aberration occurs, FIG. 14B shows the case where no spherical aberration occurs, and FIG. 14C shows the case where the positive spherical aberration occurs. In either one of FIGS. 14A, 14B and 14C, there is no focal shift. In FIGS. 14A and 14C, the region which belongs to the light-receiving section and to which the light beam in the vicinity of the optical axis is applied is indicated by the right-hand-side-up hatching, while the region which belongs to the light-receiving section and to which the light beam in the peripheral portion is applied is indicated by the right-hand-side-down hatching.

That is, FIG. 14B shows the state in which neither focal shift nor spherical aberration occurs. In this state of FIG. 14B, the first light beam is formed so that the light-receiving areas of the photodetectors 7a and 7b become equal to each other. That is, the value of the electric signal S1 obtained from the photodetector 7a and the value of the electric signal S2 obtained from the photodetector 7b become equal to each other. In the measuring unit 7 shown in FIG. 13, the focal shift signal FES and the spherical aberration signal SAS can be generated by the same method as described in detail hereinabove in the case of the measuring unit 7 shown in FIG. 3.

However, the measuring unit 7 shown in FIG. 13 has the demerit that the sensitivity (gain) of the spherical aberration signal SAS is reduced by comparison with that of the measuring unit 7 shown in FIG. 3.

In this case, if FIG. 14A is compared with FIG. 5A, then the light beam received by the photodetector 7d in FIG. 14A has a larger quantity of light than that of the light beam received by the photodetector 7d in FIG. 5A. That is, even when same negative spherical aberration occurs, the spherical aberration signal SAS shown in FIG. 13 has a lowered sensitivity by comparison with the spherical aberration signal SAS shown in FIG. 4.

Likewise, if FIG. 14C is compared with FIG. 5C, then the light beam received by the photodetector 7c in FIG. 14C has a larger quantity of light than that of the light beam received by the photodetector 7c in FIG. 5C. That is, even when same positive spherical aberration occurs, the spherical aberration signal SAS shown in FIG. 13 has a lowered sensitivity by comparison with the spherical aberration signal SAS shown in FIG. 4.

The hologram 2 has been employed as a means for guiding the light beam reflected on the information recording layer of the optical disk 6 to the measuring unit 7 in the present embodiment. However, the present invention is not limited to this, and, for example, a combination of a beam splitter and a wedge prism may also be employed. However, for the purpose of compacting the device, the hologram 2 should preferably be employed. The hologram can concurrently serve as a means for forming a second light beam and a third light beam for measuring the tracking error signal, and therefore, the reduction in number of components and the compacting of the device can be achieved.

In general, with regard to the light-concentrating optical system 10, the spherical aberration is sufficiently corrected with respect to the prescribed thickness of the cover glass 6a and the prescribed information recording layer. That is, the light beam concentrated on the specified information recording layer has a sufficiently reduced beam diameter including no spherical aberration.

However, the spherical aberration is corrected by adjusting the interval between the first element 4 and the second element 5 that constitute the light-concentrating optical system 10 in the present embodiment. Therefore, the light-concentrating optical system 10 is not required to have a sufficiently corrected spherical aberration with respect to the prescribed thickness of the cover glass 6a and the prescribed information recording layer.

That is, when assembling the light-concentrating optical system 10 or the optical pickup device 11 that includes the light-concentrating optical system 10, it is generally proper to adjust the interval between the first element 4 and the second element 5 to the prescribed value, and there may be a lens interval error. Due to this lens interval error in the assembling stage, a spherical aberration occurs in the light-concentrating optical system 10.

Furthermore, when manufacturing the first element 4 and the second element 5, the first element 4 and the second element 5 may have a lens thickness error. Due to this lens thickness error in the manufacturing stage, a spherical aberration occurs in the light-concentrating optical system 10.

The spherical aberration of the light-concentrating optical system 10 occurring due to the lens interval error and the lens thickness error is measured in the form of the spherical aberration signal SAS, and the concentration can be achieved on the basis of this spherical aberration signal SAS.

Although the aberration measurement and the aberration correction of the light-concentrating optical system 10 of the combination of the first element 4 and the second element 5 have been described in connection with the present embodiment, the present invention is not limited to this. For example, the present invention can be applied to a light-concentrating optical system obtained by combining a plurality of lens groups.

Although the spherical aberration is corrected by adjusting the interval between the first element 4 and the second element 5 in the present embodiment, the present invention is not limited to this. An interval between the semiconductor laser 1 and the collimation lens 3 may be adjusted by moving, for example, the collimation lens 3. In this case, the light beam that has been emitted from the semiconductor laser 1 and has passed through the collimation lens 3 becomes a nonparallel light and is able to generate a spherical aberration. With this spherical aberration, the spherical aberration of the light-concentrating optical system 10 can be corrected.

A spherical aberration correction mechanism may be inserted between the light-concentrating optical system 10 and the collimation lens 3. The spherical aberration correction mechanism constitutes an optical system that generates a spherical aberration when the light beam passes through the spherical aberration correction mechanism. It is proper to employ an afocal optical system obtained by combining a convex lens that has a positive power and a concave lens that has a negative power as the spherical aberration correction mechanism. A spherical aberration can be generated by adjusting an interval between the two lenses. Furthermore, it is acceptable to employ an afocal optical system obtained by combining two convex lenses that have a positive power as another construction of the spherical aberration correction mechanism. In this case, a spherical aberration can also be generated by adjusting an interval between the two lenses.

In the aforementioned embodiment, the aberration detection and the focal shift detection have been performed by means of the identical light beam (first light beam) incident on the measuring unit 7 and the light-receiving regions arranged with interposition of the identical axis of symmetry SY. However, the present invention is not limited to this, and it is acceptable to perform the aberration detection and the focal shift detection by means of different light beams and light-receiving regions arranged with interposition of different axes of symmetry.

Figure 1:
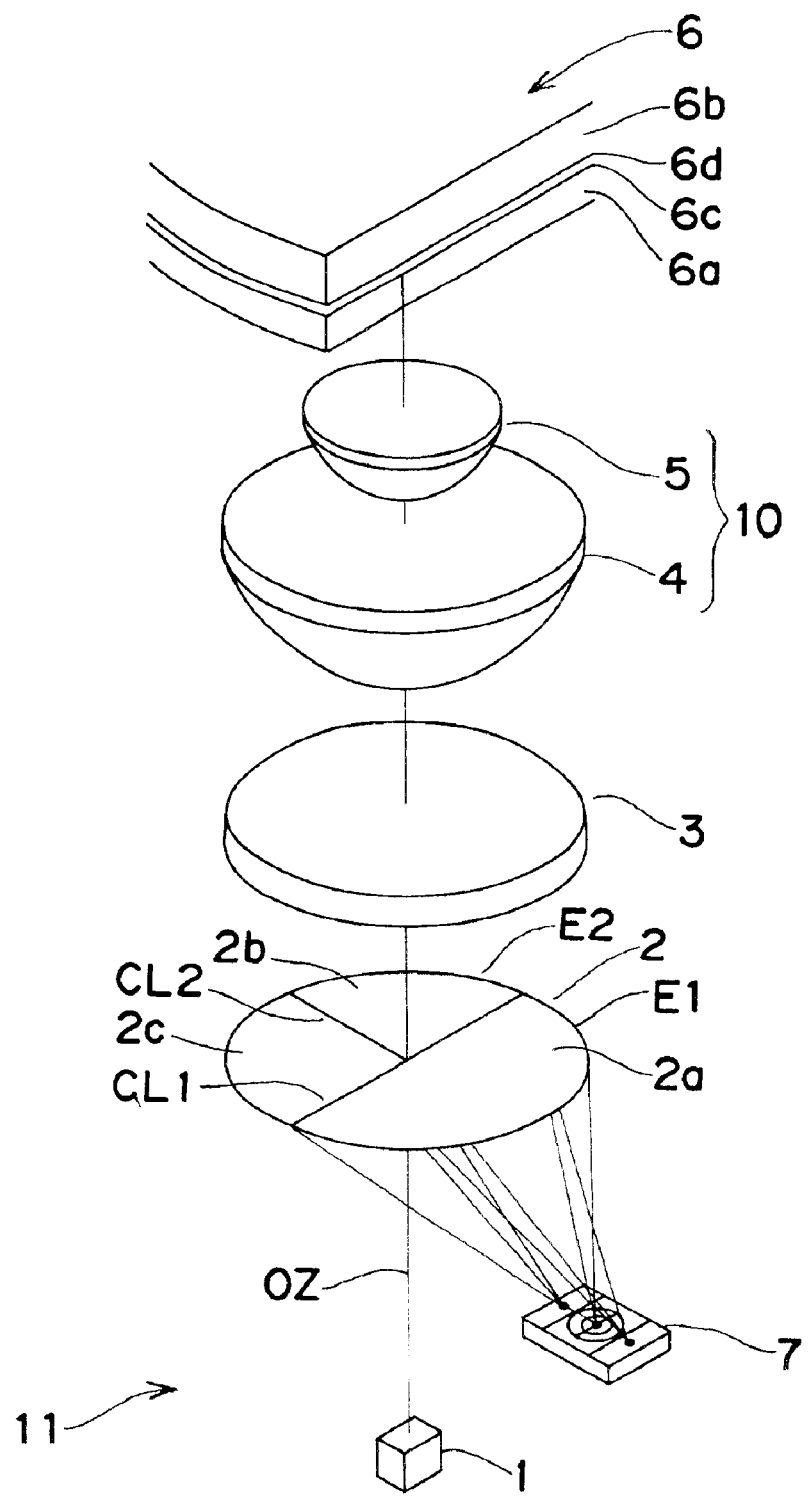
FIG. 1 is a schematic diagram showing an optical pickup device according to an embodiment of the present invention.

For example, a half mirror is provided between the hologram 2 and the collimation lens 3 in FIG. 1. Then, the second the light beam is generated by splitting the light beam reflected on the half mirror by a straight line (second straight line) perpendicular to the optical axis, and the focal shift signal is generated by detecting the second light beam by two regions provided with interposition of the axis of symmetry corresponding (parallel) to the second straight line. Further, an aberration signal is generated by means of the hologram 2 and the measuring unit 7 from the light beam that has passed through the half mirror as described above. It is to be noted that the photodetectors 7a and 7b of the measuring unit 7 are not necessary in this case.

According to the present invention, there is no need for separately providing a thickness sensor, and the focal shift and the spherical aberration can be measured with high accuracy. Based on the measurement results, the focal shift and the spherical aberration can be corrected.

Therefore, according to the optical pickup device of the present invention, the recording of information on the information recording layer of a single-layer optical disk or a multi-layer optical disk and the reproduction of information from the information recording layer can be appropriately executed even when the cover glass thickness error, the lens interval error and the lens thickness error exist. This consequently allows the dimensional reduction, cost reduction and manufacturing in a short time to be achieved.

The invention being thus described, it will be obvious that the invention may be varied in many ways. Such variations are not be regarded as a departure from the spirit and scope of the invention, and all such modifications as would be obvious to one skilled in the art are intended to be included within the scope of the following claims.

What is claimed is:

1. An optical pickup device comprising:
    a light source;
    a light-concentrating optical system for concentrating a light beam emitted from the light source on a recording surface of an optical disk;
    an optical element means for splitting the light beam that has been reflected on the recording surface and has passed through the light-concentrating optical system;

a light-receiving means for receiving a split light beam as a first light beam from the optical element means and measuring quantities of light of the split light beam; and an aberration signal generating means for generating an aberration signal that represents an aberration of the light-concentrating optical system based on a quantity of light of a portion near an optical axis of the first light beam and a quantity of light of a portion separated from the optical axis of the first light beam, wherein the optical element means generates the first light beam by splitting the light beam, which has passed through the light-concentrating optical system, along a first straight line that is perpendicular to the optical axis of the light beam and serves as a boundary such that the first light beam is directed to the light receiving means, the light receiving means comprises a first photodetector region and a second photodetector region arranged in positions located apart from the optical axis of the first light beam, the first photodetector region and the second photodetector region are provided substantially linearly symmetrical with respect to a straight line axis of symmetry corresponding to the first straight line, said straight line axis of symmetry being located on the light receiving means and extending through the optical axis of the first light beam, and the aberration signal generating means generates the aberration signal by using a difference between electric signals from the first photodetector region and the second photodetector region; and wherein the optical element means generates a second light beam by splitting the light beam that has passed through the light-concentrating optical system along a second straight line perpendicular to the optical axis of the light beam and serves as a boundary such that the second light beam is directed to the light-receiving means, the light-receiving means comprises a third photodetector region and a fourth photodetector region, the third photodetector region and the fourth photodetector region are provided approximately linearly symmetrical with respect to an axis of symmetry of a straight line that extends through the optical axis of the second light beam and is located on the light-receiving means corresponding to the second straight line, the third photodectector region and the fourth photodetector region are located at respective distances from the optical axis of the second light beam, said respective distances being shorter than the respective distances of the first photodetector region and the second photodetector region from the optical axis of the first light beam, and a focal shift signal generating means is provided for generating a focal shift signal by using a difference between electric signals from the third photodetector region and the fourth photodetector region.

2. An optical pickup device as claimed in claim 1, wherein, the focal shift signal generating means generates the focal shift signal according to calculation expressed by:

$$(S1-S2)+(S3-S4) \times K$$

where K is a constant, and S1, S2, S3 and S4 are signals from the third, fourth, first and second regions, respectively.

3. An optical pickup device as claimed in claim 1, further comprising a storage means for storing a plurality of focal shift signals in correspondence with a plurality of combinations of the difference between the electric signals from the first region and the second region and the difference between the electric signals from the third region and the fourth region, and wherein the focal shift signal generating means reads from the storage means the focal shift signal corresponding to the difference between the electric signals from the first region and the second region and the difference between the electric signals from the third region and the fourth region based on the electric signals from the first through fourth regions from the light-receiving means, and outputs the focal shift signal.

4. An optical pickup device as claimed in claim 1, wherein the first straight line and the first light beam are identical to the second straight line and the second light beam, respectively, when the first through the fourth photodetector regions have a common optical axis.

5. An optical pickup device as claimed in claim 4, wherein the third photodetector region and the fourth photodetector region of the light-receiving means are each formed in a semicircular shape whose chord coincides with the axis of symmetry, and the first photodetector region and the second photodetector region of the light-receiving means are formed in semicircular annular shapes whose internal circumferences have radii greater than radii of outermost circumferences of the third photodetector region and the fourth photodetector region and arranged outside the outermost circumferences of the third photodector region and the fourth photo detector region, respectively.

6. An optical pickup device as claimed in claim 4, wherein the first photodector region, the third photodetector region, the fourth photodectector region and the second photo detector region of the light-receiving means are each formed in a rectangular shape and arranged parallel in this order in a direction perpendicular to the axis of symmetry.

* * * * *